United States Patent
Horie et al.

(10) Patent No.: US 7,927,167 B2
(45) Date of Patent: Apr. 19, 2011

(54) GETTER MATERIAL AND EVAPORABLE GETTER DEVICE USING THE SAME, AND ELECTRON TUBE

(75) Inventors: Hiromichi Horie, Kanagawa-Ken (JP); Yoshiyuki Fukuda, Kanagawa-Ken (JP); Hiromasa Kato, Kanagawa-Ken (JP); Nobuaki Nakashima, Kanagawa-Ken (JP); Yasuhisa Makino, Kanagawa-Ken (JP)

(73) Assignees: Kabushiki Kaisha Toshiba, Tokyo (JP); Toshiba Materials Co., Ltd., Yokohama-Shi (JP)

( * ) Notice: Subject to any disclaimer, the term of this patent is extended or adjusted under 35 U.S.C. 154(b) by 0 days.

(21) Appl. No.: 12/839,230

(22) Filed: Jul. 19, 2010

(65) Prior Publication Data

US 2010/0275727 A1 Nov. 4, 2010

Related U.S. Application Data

(62) Division of application No. 11/814,860, filed as application No. PCT/JP2005/001547 on Jan. 27, 2005, now abandoned.

(51) Int. Cl.
*H01J 9/39* (2006.01)
*H01J 9/38* (2006.01)

(52) U.S. Cl. ............ 445/38; 445/41; 445/53; 445/55; 313/553; 313/561

(58) Field of Classification Search .......... 445/38, 445/41, 53, 55; 313/553, 561
See application file for complete search history.

(56) References Cited

U.S. PATENT DOCUMENTS 3,428,168 A * 2/1969 Reash .................. 417/49
(Continued)

FOREIGN PATENT DOCUMENTS

EP 0 836 213 A1 4/1998
(Continued)

OTHER PUBLICATIONS

Office Action issued Dec. 7, 2010, in Japan Patent Application No. 2007-500401.

*Primary Examiner* — Bumsuk Won
*Assistant Examiner* — Nathaniel J Lee
(74) *Attorney, Agent, or Firm* — Oblon, Spivak, McClelland, Maier & Neustadt, L.L.P.

(57) ABSTRACT

The present invention provides a getter material configured by a pressed powder mixture comprising Ba—Al alloy powder and Ni powder, wherein when the pressed powder mixture is heated in a vacuum atmosphere or an inert gas atmosphere, a temperature at which an exothermic reaction starts is ranging from 750° C. to 900° C. According to this getter material, since the temperature at which the pressed powder mixture starts the exothermic reaction is set within a range from 750° C. to 900° C., there can be provided a getter material and an evaporation type getter device capable of suitably controlling an evaporation amount of getter components under a stable condition, and is excellent in responsiveness because a time ranging from a starting time of heating the getter material to a starting time of evaporation of the getter components can be shortened. In addition, the metal container to be filled with the getter material is free from deformation and melting, and a heat-evaporation process time of the getter material can be shortened, so that there can be provided the evaporation type getter device excellent in responsiveness because a time required for the electron tube to attain to a predetermined vacuum degree can be also shortened.

15 Claims, 2 Drawing Sheets

U.S. PATENT DOCUMENTS

| | | | |
|---|---|---|---|
| 4,642,516 A * | 2/1987 | Ward et al. | 313/481 |
| 6,104,138 A * | 8/2000 | Martelli et al. | 313/546 |
| 6,926,575 B1 | 8/2005 | Nakayama et al. | |

FOREIGN PATENT DOCUMENTS

| | | |
|---|---|---|
| JP | 3-78928 | 4/1991 |
| JP | 5-82054 | 4/1993 |
| JP | 6 103932 | 4/1994 |
| JP | 6-103932 | 4/1994 |
| JP | 11 509037 | 8/1999 |
| JP | 2003 168365 | 6/2003 |
| JP | 2003-168365 | 6/2003 |
| JP | 2003168365 A * | 6/2003 |
| WO | WO 97/29503 | 8/1997 |
| WO | WO 0060634 A1 | 10/2000 |

* cited by examiner

GETTER MATERIAL AND EVAPORABLE GETTER DEVICE USING THE SAME, AND ELECTRON TUBE

TECHNICAL FIELD

The present invention relates to a getter material, which is used for realizing a vacuum state required for an electron tube by absorbing an unnecessary gas components containing in the electron tube such as a cathode ray tube, and also relates to an evaporation type getter device and an electron tube using the getter material. More particularly, The present invention relates to a getter material, an evaporation type getter device and an electron tube using the same capable of suitably controlling an evaporation amount of getter components under a stable condition, and is excellent in responsiveness because a time ranging from a starting time of heating the getter material to a starting time of evaporation of the getter components is short.

BACKGROUND ART

Generally, when an electron tube such as cathode ray tube (CRT) or the like is operated under a condition where a vacuum pumping from inside of the electron tube is insufficient, such insufficient vacuum degree has an adverse influence on characteristics of the electron tube. Therefore, in the electron tube, there is provided a getter device for sufficiently removing unnecessary gas components from the inside of the electron tube.

In recent years, for example, in a technical field of television (TV) for civil applications, a large-screen TV set having a screen size of about 32 to 37 inches has become widely used. Under this situation, the CRT to be used for such the large-screen TV has been increased in size thereof. In such a large-sized electron tube, number of, parts to be assembled into the tube is also increased. Simultaneously, a volume of the electron tube is also further increased.

Therefore, it becomes more and more important to improve the characteristics per se and stability of the characteristics of the getter device for maintaining a high degree of vacuum in the electron tube by adsorbing both: a residual gas remained in the electron tube after completion of the vacuum-pumping operation using a vacuum pump in the electron tube manufacturing process; and the unnecessary gas components released from respective parts including a vacuum chamber arranged in the electron tube.

Concretely, for the purpose of absorbing the unnecessary gasses released in the electron tube, the electron tube typically represented by CRT is equipped with an evaporation type getter device which is manufactured by: preparing a getter material consisting of a mixture of Ba—Al alloy powder containing Ba, Al as main component and Ni powder; and filling the getter material into a metal container formed of an alloy such as iron, steel, Ni alloy, stainless steel.

In this getter device, when the getter material consisting of the mixture of Ba—Al alloy powder and Ni powder is heated to rise a temperature thereof, an exothermic reaction of bringing Al component and Ni component into combination is started at a predetermined constant temperature, Ba component contained in the getter material is vaporized (getter-flashed), and an impurity-gas adsorbing function is exhibited by the Ba component. As a result, a degree of vacuum in the electron tube can be maintained to a predetermined value.

Accordingly, the getter device equipped in the electron tube is required to evaporate a predetermined amount of Ba (barium) by which the unnecessary gasses contained in the electron tube is absorbed thereby to increase the degree of vacuum in the electron tube. Therefore, when the amount of the evaporated Ba is small, the predetermined degree of vacuum required for the electron tube cannot be obtained.

On the other hand, when the amount of evaporated Ba is excessively large, Ba-amount to be adhered to structural members such as inner wall or the like of the electron tube also becomes excessively large. Therefore, the excess amount of Ba becomes a cause of inviting troubles such that an abnormal discharge is liable to occur and a part of Ba adhered to the inner wall is dropped and adhered to another portion within the electron tube thereby to obstruct a normal operation of the electron tube. Accordingly, it is technically important to control the amount of evaporated Ba so as to be within a predetermined range required for the electron tube.

However, in the conventional getter materials, although a temperature at which the exothermic reaction of the getter material starts has a great influence on Ba evaporation amount, such a technical fact has not been recognized at all. In addition, needless to say, a range of the exothermic reaction starting temperature has not been clearly determined to a specified range. Therefore, a dispersion or scattering of the exothermic reaction becomes large, so that there has been posed a problem that the Ba evaporation amount cannot be sufficiently controlled.

Further, in general, the getter material is filled into a metal container having an opening portion called a getter ring for evaporating the Ba component, and the getter material is actually used in the packed state. However, when the exothermic reaction starting temperature is excessively high, there has been also posed problem that a thermal deformation and melting of the metal container per se are liable to occur, so that the evaporation of Ba cannot be performed with a stable condition.

As a method of evaporating Ba from the getter device equipped in the electron tube, there has been generally adopted a method in which a predetermined radio frequency induction generated by radio frequency induction power is applied from an outside of the electron tube to the getter material disposed in the electron tube under a non-contacting state thereby to heat the getter material.

According to this heating method, there can be provided tangible advantages that the getter material can be heated under a condition where the heating operation would not affect to other portions except the getter device in the electron tube sealed in a vacuum condition, and it is easy to rapidly heat the getter material whereby a process time required for producing the electron tube can be shortened, thus being advantageous for the process of manufacturing the electron tube.

However, in the above heating method by applying the high-frequency magnetic field, the metal container filled with the getter material is also heated at the time of heating the getter material. At this time, a relationship between a specification of the metal container and radio frequency induction heating conditions have not been paid attention at all in the conventional getter device, so that there have been also posed the following problems. Namely, in a case where a ratio for heating the metal container by the radio frequency induction power is remarkably larger than that for heating the getter material, a temperature rise of the metal container becomes greatly larger than that of the getter material, so that the metal container is easily deformed and molten before the exothermic reaction of the getter material is started.

As a result, there is posed a problem such that it becomes difficult to stably evaporate the getter component, and the temperature rise of the getter material per se is delayed. In addition, it requires a long heating-evaporation process time for the getter material to obtain a sufficient evaporation amount of Ba so as to attain a predetermined vacuum degree in the electron tube. In other words, the evaporation amount of Ba corresponding to the heating time and responsiveness until the predetermined degree of vacuum is obtained are lowered, thus being a bottleneck problem. On the other hand, there has been also posed a problem that when the heating-evaporation process time is set to be short, the amount of evaporated Ba is insufficient, so that it becomes difficult to obtain the vacuum degree required for the electron tube.

The present invention had been achieved to solve the aforementioned problems, and an object of the present invention is to provide a getter material, an evaporation type getter device and an electron tube capable of suitably controlling an evaporation amount of getter components under a stable condition, and is excellent in responsiveness because a time ranging from a starting time of heating the getter material to a starting time of the evaporation of the getter components is short. (i.e., the evaporation amount of Ba corresponding to the heating time and responsiveness until the predetermined degree of vacuum is obtained are excellent.)

Another object of the invention is to provide an evaporation type getter device and an electron tube using the getter device in which the metal container to be filled with the getter material is free from deformation and melting, and a heat-evaporation process time of the getter material can be shortened, so that there can be provided the evaporation type getter device excellent in responsiveness because a time required for the electron tube to attain to a predetermined vacuum degree can be also shortened.

DISCLOSURE OF THE INVENTION

In order to achieve the aforementioned objects, the inventors of the present invention had assembled various getter devices through a method comprising the steps of: preparing material powders having various grain sizes; pressing the material powder at various molding pressures to form getter materials; preparing metal containers having various thickness; and filling the getter materials into the metal containers thereby to assemble the various getter devices.

With respect to thus assembled getter devices, the following points were investigated. Namely, there were comparatively reviewed the influences of the conditions such as the exothermic reaction starting temperature of the getter material or the like onto a size of evaporation amount of the getter material, controllability and stability of the evaporation, responsiveness indicated by a heating time required for the getter component to start evaporating, and a possibility of deformation or melting of the metal container or the like.

As a result, the following technical findings were firstly obtained. That is, particularly, when a material powder having a predetermined fine grain size is molded at a predetermined molding pressure to form a pressed powder mixture and an exothermic reaction starting temperature of the pressed powder mixture is limited to within a specified range, it became possible to adequately control the evaporation amount of the getter components under a stable state, and there could be obtained a getter material and an evaporation type getter device excellent in responsiveness because a time ranging from a starting time of heating the getter material to a starting time of evaporation of the getter components is short.

In addition, when a thickness of the metal container, for being filled with the getter material, which is made from an alloy mainly composed of Fe or Ni, and a frequency of the radio frequency induction for heating the getter material and evaporating Ba component from the getter material, are adjusted so as to have a predetermined relation, there can be provided an evaporation type getter device in which the metal container is free from deformation and melting, and a heat-evaporation process time of the getter material can be shortened, so that there can be provided the evaporation type getter device excellent in responsiveness because a time required for the electron tube to attain to a predetermined vacuum degree can be also shortened. The present invention had been achieved on the basis of the above findings.

Namely, the getter material according to the present invention is configured by a pressed powder mixture comprising Ba—Al alloy powder and Ni powder, wherein when the pressed powder mixture is heated in a vacuum atmosphere or an inert gas atmosphere, a temperature at which an exothermic reaction starts is ranging from 750° C. to 900° C.

The Ba—Al alloy powder constituting the above getter material is not limited to $BaAl_4$ alloy powder. As far as a material takes an exothermic reaction between Ni component and Al component thereby to form a Ni—Al alloy and simultaneously evaporates Ba as the getter component, such material can be used. Such exothermic reaction is liable to occur when Ba—Al alloy and Ni are mixed as fine powder materials and heated the powder mixture.

In this regard, Ni powder having a grain size of 10 μm is easily available as carbonyl nickel. On the other hand, Ba—Al alloy powder is manufactured through a method in which Ba and Al compound is molten and solidified to form an alloy ingot, then the alloy ingot is pulverized. At this time, $BaAl_4$ as an intermetallic compound becomes brittle, so that the pulverizing operation of $BaAl_4$ can be easily performed. In view of the pulverizing operation, it is not always necessary to use $BaAl_4$ compound having a strict stoichiometric composition as the Ba—Al alloy, alloy material having a composition close to $BaAl_4$ may also be suitably used. Concretely, it is also suitable to use a Ba—Al alloy having a composition ranging from a composition in which an Al mass ratio is 10% larger than Al amount in the composition of $BaAl_4$ to a composition of $BaAl_2$. More concretely, it is also suitable to use a Ba—Al alloy powder containing an Al amount of 27-50% in terms of mass ratio.

In the above getter material, when the getter material composed of the pressed powder mixture comprising: $BaAl_4$ alloy powder mainly composed of Ba and Al of $BaAl_4$; and Ni powder is heated and temperature thereof is increased, Ni component reacts with Al component in accordance with an exothermic reaction formula (1). Simultaneously, Ba component is evaporated and absorb impurity gasses thereby to exhibit a function of the evaporation type getter device.

$$BaAl_4 + 4Ni \rightarrow 4NiAl + Ba \qquad (1)$$

As is clear from the above exothermic reaction formula, a mass ratio of $BaAl_4$ alloy powder and Ni powder is generally set to a value of 50%:50%. In the exothermic reaction of the getter material, there may be a case where an alloy having a composition in which Ni:Al ratio is other than 1:1 is formed, or all of Ba contained in Ba—Al is not evaporated and a part of Ba is remained as an alloy having a composition different from that of $BaAl_4$. Therefore, depending on a condition of the getter material, a condition of the getter device in which the getter material is filled into the metal container, or conditions of temperature applied to the getter material and heating time, the amount of Ba evaporation is greatly different even if the same getter material is used at the same amount in the getter device.

In the getter material of the present invention, when the getter material configured by the pressed powder mixture is heated in a vacuum atmosphere or an inert gas atmosphere, a temperature at which an exothermic reaction starts in the pressed powder mixture is specified to within a range from 750° C. to 900° C.

When this exothermic reaction starting temperature is lower than 750° C., Ba as the getter component is liable to excessively evaporate at a low temperature, so that it becomes difficult to control the evaporation amount of Ba. Simultaneously, the getter component is easily react in the air, so that even if a heating operation at a low temperature, which is required for assembling process of the electron tube, is performed, the getter component is easily damaged by oxidization or the like.

On the other hand, in a case where the exothermic reaction starting temperature is excessively high so as to exceed 900° C., a heating energy amount required to be applied to the getter material becomes large, so that a time span ranging from a start of heating to a start of the exothermic reaction is prolonged, and a sufficient amount of evaporated getter component cannot be obtained in a short time. In also this case, it becomes difficult to control the evaporation amount per se, and a response time until a predetermined vacuum degree is attained in the electron tube is delayed. Accordingly, the above exothermic reaction starting temperature is specified in the range of 750° C. to 900° C.

In this connection, when the grain sizes of $BaAl_4$ alloy powder and Ni powder to be mixed for preparing a getter material are set to an extremely fine region of about 1 μm or less, it is possible to lower the exothermic reaction starting temperature per se to be lower than 700° C. thereby to increase an evaporation amount of the getter component. However, as previously mentioned, Ba—Al alloy powder has a property of being easily deteriorated in the air due to reaction such as oxidization or the like. In a process of manufacturing the electron tube, the getter device containing Ba—Al alloy powder is attached in the electron tube. Thereafter, the electron tube is made vacuous. During the above manufacturing processes, the getter device is exposed to the air. Therefore, it is extremely difficult to actually prevent the getter device from being deteriorated by air.

Further, in a process of manufacturing CRT, there is a case where the getter device is exposed to a high temperature air in a glass frit process for assembling a face portion and a funnel portion of CRT prior to make vacuum although the high temperature condition is varied in accordance with a portion to which the getter device is provided. At this time, since Ba—Al alloy such as $BaAl_4$ or the like has a high reactivity, the deterioration of Ba—Al alloy due to oxidization is unavoidable to some extent.

In particular, when the grain size of the Ba—Al alloy powder is extremely fine region to be 1 μm or less, the deterioration phenomena of the alloy becomes abruptly notable, thereby to greatly lower the performance of the getter device. Therefore, a weight ratio of the extremely fine $BaAl_4$ alloy powder having a grain size of 1 μm or less contained in an entire $BaAl_4$ alloy material powder is preferably controlled to 10 wt % or less. On the other hand, Ni powder is hardly degraded by oxidation in comparison with $BaAl_4$ alloy powder, so that it is unnecessary to specify a lower limit of the grain size thereof.

According to thus configured getter material, since the temperature at which the pressed powder mixture starts the exothermic reaction is set within a range from 750° C. to 900° C., there can be provided a getter material and an evaporation type getter device capable of suitably controlling an evaporation amount of getter components under a stable condition, and is excellent in responsiveness because a time ranging from a starting time of heating the getter material to a starting time of evaporation of the getter components can be shortened. In addition, the metal container to be filled with the getter material is free from deformation and melting, and a heat-evaporation process time of the getter material can be shortened, so that there can be provided the evaporation type getter device excellent in responsiveness because a time required for the electron tube to attain to a predetermined vacuum degree can be also shortened.

In an electron tube such as CRT or the like using the above evaporation type getter device, it is required to evaporate a predetermined amount of Ba as a getter component (gas adsorbing component) for increasing a vacuum degree in the electron tube by absorbing the impurity gasses remained inside of the electron tube body or by adsorbing an unnecessary gas generated from the respective parts including a vacuum chamber constituting the electron tube.

In this regard, when the amount of evaporated Ba is small, a vacuum degree required for the electron tube cannot be obtained. In contrast, when the amount of evaporated Ba is excessively large, the amount of Ba adhered to an inner wall of the electron tube is also excessively large, thereby to cause an abnormal discharge. In addition, a part of the adhered substance would fall down from the inner wall of the electron tube and the fallen substance will adhere to another portion in the electron tube, thus being a cause of having troubles in a normal operation of the electron tube. Therefore, it is technically important to control the amount of Ba evaporation to within a predetermined range required for the electron tube.

In contrast, in the conventional getter material, since the exothermic reaction starting temperature have not been determined to a suitable range, a scattering of the exothermic reaction becomes large, and it was difficult to sufficiently control the Ba evaporation amount. Further, the getter material has been used in a form in which the getter material is filled into a metal container having an opening surface, so called a getter rings through which the Ba is evaporated. When the exothermic reaction starting temperature is excessively high, there has been also posed problems such that the metal container is easily deformed thermally and molten.

Further, the getter material is formed as a press-molded body obtained by press-molding a mixture composed of Ba—Al alloy powder such as $BaAl_4$ or the like and Ni powder. However, the exothermic reaction starting temperature of the press molded body varies in accordance with a composition ratio of Ni powder and Ba—Al alloy powder such as $BaAl_4$ or the like contained in the getter material, grain sizes of the respective material powders, molding pressure for press-molding a material mixture. It may be considered that the exothermic reaction starting temperature should be a low temperature, because a time required for heating the getter can be shortened and the problem of the melting of the metal container can be eliminated. However, in the actual getter material, a relationship between the exothermic reaction starting temperature and the Ba evaporation amount has not been clear, so that the Ba evaporation amount cannot be suitably controlled.

In contrast to this, in the getter material and the evaporation type getter device using the material according to the present invention in which the getter material composed of a mixed body comprising the Ba—Al alloy powder such as $BaAl_4$ or the like and Ni powder, when the exothermic reaction starting temperature is set to a range 750° C. to 900° C., it was found that a time range from a time when the getter started to be heated by radio frequency induction until a time when the Ba component starts evaporating can be shortened and the evaporation amount of Ba can be attained to within a predetermined stable range. The present invention had been achieved on the basis of the above findings.

When the grain size of the Ba—Al alloy powder such as $BaAl_4$ or the like and Ni powder is set to be fine, the exothermic reaction starting temperature of the getter material used in the above getter device is shifted to a low temperature side. In contrast, when the grain size is set to be large, the exothermic reaction starting temperature is shifted to a high temperature side. This is because a contact surface area between the Ba—Al alloy powder and Ni powder is increased due to the fine grain size of the material powders, thereby to allow the exothermic reaction starting temperature of the Ba—Al alloy powder such as $BaAl_4$ or the like and Ni powder to shift to the low temperature side.

In this regard, when the grain sizes of both the Ba—Al alloy powder such as $BaAl_4$ or the like and Ni powder are set to 10 μm or less, it becomes possible to prepare a getter material having the exothermic reaction starting temperature of 750° C. or lower than 700° C. However, the Ba—Al alloy powder such as $BaAl_4$ or the like and Ni powder are chemically active materials inherently. Therefore, when the powder has a grain size of 1 μm or less, there has been posed a problem such that a property of the powder is easily varied and degraded by oxidation thereof even under an ambient atmosphere (air condition) to which electron tube parts are exposed during a manufacturing process of the electron tube.

Therefore, in the present invention, in order to maintain a stable property within a process condition for manufacturing the electron tube to which the getter device is equipped, an average grain size of the Ba—Al alloy powder is set to 44 μm or less (it is preferable that a mass ratio of the fine Ba—Al alloy powder such as $BaAl_4$ or the like having a grain size of 1 μm or less contained in the $BaAl_4$ material powder is 10 mass % or less.), or the grain size of the Ba—Al alloy powder is set to within a range from several tens microns to 150 μm. In this regard, it is preferable that a maximum grain size is 300 μm or less. When the average grain size of the Ba—Al alloy powder is set to within the above range, it was confirmed that a sufficient evaporation amount of Ba can be stably obtained within the exothermic reaction starting temperature of 750° C. to 900° C.

On the other hand, Ni powder has more stable property and is less deteriorated by oxidation than the Ba—Al alloy powder such as $BaAl_4$ or the like under a manufacturing environment of the electron tube, so that there is caused no problem even if the grain size of Ni powder is small. However, it was confirmed that Ni powder having a grain size of 10 μm or less is preferable for the purpose of increasing the contact surface area contacting Ba—Al alloy powder thereby to improve a reactivity with the Ba—Al alloy powder.

Further, the following findings were also obtained. Namely, when a mixing ratio (mass ratio) of the $BaAl_4$ powder and Ni powder was set to 48:52-56:44, a maximum evaporation amount of Ba was obtained. In this connection, in a case where a Ba—Al alloy powder of which composition is somewhat deviated from that of $BaAl_4$ powder, Al mixing ratio with respect to Ni is preferably set to almost the same range as in $BaAl_4$ alloy.

Furthermore, when taking the contacting area between the Ba—Al alloy powder and Ni powder into consideration, it is preferable to use a powder in which a mass ratio of the Ba—Al alloy powder having a grain size (absolute value) of 1 μm or less is less than 10% and the maximum grain size thereof is 300 μm or less. On the other hand, it is preferable to use a Ni powder having a maximum grain size of 20 μm or less and an average grain size of 10 μm or less.

Still further, as to the Ni powder for the getter material, it is preferable to use a Ni powder in which a mass ratio of the Ni powder having a grain size of 20 μm or more is less than 10%. When the grain size of Ni powder is excessively large, the contacting area between the Ba—Al alloy powder and Ni powder becomes small, so that the exothermic reaction starting temperature is disadvantageously arisen whereby the evaporation amount of Ba is liable to be insufficient. Accordingly, it is preferable to use a Ni material powder in which a mass ratio of the Ni powder having a grain size of 20 μm or more is less than 10%.

Further, in the above getter material, it is preferable that the pressed powder mixture is a press-compacted body shaped by press-compacting a power mixture comprising the Ba—Al alloy powder and the Ni powder at a compacting pressure of 400 MPa or more.

In a case where the pressed powder mixtures each having the same composition of $BaAl_4$ alloy powder and Ni powder were manufactured as getter materials by a pressure-compacting method in which the compacting pressure is set to a predetermined pressure or lower, the exothermic reaction starting temperature is abruptly raised in some getter materials, and the getter materials formed at the specified compacting pressure or higher have a relatively stable exothermic reaction starting temperature.

In the getter materials manufactured by the press-compacting method in which $BaAl_4$ powder having an average grain size of 44 μm or less or having a grain size of several tens microns to 150 μm and Ni powder having a grain size of 10 μm or less were used, when a compacting pressure of 400 MPa or higher was applied, the exothermic reaction starting temperature in a predetermined range could be obtained.

In contrast, in a case where the grain size of Ni powder was set to a range of 10 to 20 μm, the exothermic reaction starting temperature is increased at the molding pressure of less than 1000 MPa, so that the exothermic reaction starting temperature of 750° C. to 900° C. at which a stable evaporation amount of Ba could be obtained. Accordingly, for the purpose of obtaining a suitable evaporation amount of Ba, it is technically important to suitably control the compacting pressure in accordance with the grain sizes of the material powders for the getter material.

The evaporation type getter device according to the present invention is configured by comprising: a metal container; and a getter material as a press-compacted body filled in the metal container.

It is important that the above getter material is filled in the metal container so as to tightly contact the metal container and so as not to form a gap between the metal container and the filled getter material. When the gap is formed between the metal container and the filled getter material, a possibility of falling down of an entire getter material or a part of the getter material as the press-compacted body is increased. Even if a small amount of the getter material is fallen down, the falling down may be a cause of abnormal discharge or clogging of shadow mask holes, thus resulting in lowering in performance of the electron tube.

An operation for evaporating Ba from the getter device equipped to the electron tube is performed in accordance with an operating system in which a high frequency magnetic field caused by a predetermined high frequency electric power is applied in non-contacting state from outside the electron tube to the getter device provided in the electron tube thereby to heat the getter material. According to this system, there can be provided the following advantages. Namely, in the electron tube sealed to be vacuum state, heat affection against portions other than the getter device can be mitigated, and only the getter device can be limitedly heated. In addition, it becomes easy to rapidly heating the getter device, so that a process time required for producing the electron tube can be shortened.

However, in a case where the getter material is heated by being applied with the radio frequency induction, not only the getter material but also the metal container filled with the getter material are simultaneously heated. In this point, in the conventional getter device, a relationship between this metal container and the radio frequency induction heating condition has not been paid attention at all. Therefore, there have been posed the following problems.

Namely, in a case where a heating ratio to the metal container by means of the radio frequency induction power is greatly larger than a heating ratio to the getter material, a temperature rise of the metal container becomes greatly larger than that of the getter material. As a result, there is posed a problem such that the metal container is deformed or molten before the exothermic reaction of the getter material starts, whereby the evaporation of Ba component is obstructed. In addition, the temperature rise of the getter material is slow and delayed, so that a process time required for heating and evaporating the getter material is disadvantageously prolonged.

To cope with these problems, the present invention adopts the following countermeasures. That is, a metal container for accommodating the getter material is formed from alloys such as iron, steel, Ni alloy or stainless steel. Further, a thickness of the metal container and a frequency of the radio frequency induction power for heating the getter material are controlled so as to have a specified relationship, so that there can be obtained an evaporation type getter device which is excellent in responsiveness and free from deformation or melting of the metal container, and capable of shortening the process time for heating and evaporating the getter material and capable of shortening the time until the electron tube attains to a predetermined vacuum degree.

That is, the evaporation type getter device of the present invention is characterized by comprising: a metal container formed of at least one material selected from of Fe, Ni, Fe alloy and Ni alloy; and a getter material composed of a pressed powder mixture of Ba—Al alloy powder and Ni powder, the getter material being filled in the metal container, wherein when assuming that a plate thickness of the metal container is t cm while a frequency of alternate current induction for induction heating and evaporating Ba component from the getter material is f Hz, the plate thickness t of the metal container and the frequency f of alternate current induction satisfy a relation formula:

$$t \leq 12.7/(f)^{1/2}.$$

In a case where the getter device comprising the getter material and the metal container filled with the getter material is heated by being applied with a radio frequency induction which is generated by applying a radio frequency induction power to a radio frequency induction coil, a heat energy inputted by the radio frequency induction power is applied to the getter material and the metal container, respectively.

As a material for constituting the metal container, there can be used various materials having an excellent structural strength and heat resistance, and having a sufficiently higher melting point than the exothermic reaction starting temperature of the getter material. Example of the materials may include: Fe, Fe-based alloy, Ni, Ni-based alloy, an alloy member comprising Fe or Ni and at least one element selected from a group consisting of Fe, Ni, Cr and Mn.

As the alloy member, for example, a stainless steel or the like is suitably adopted. Particularly, as the stainless steel, there is used an alloy of which amount of components such as Cr, Ni, Mn other than Fe contained in the alloy is several mass % to several tens mass %. In addition, for the purpose of increasing the structural strength or heat resistance of Fe or Ni, there can be also used an alloy material such as chrome steel to which about 1 to 5 mass % of Cr, Mn, Ni is added. Notes, Ni is added to only Fe-based alloy, while Fe is added to only Ni-based alloy.

In a case where the radio frequency induction power generated by the radio frequency induction coil is applied to the metal container formed of the above metal materials, when the frequency (f Hz) of the high frequency induction power and the plate thickness (t cm) of the metal container are set within a range so as to satisfy a relation formula (2) hereunder, it has been confirmed that the high frequency induction power is well applied to the getter material filled in the getter device, and a sufficient temperature rising rate can be obtained whereby the evaporation amount of Ba can be effectively secured without causing any deformation or melting of the metal container.

$$t \leq 12.7/(f)_{1/2} \qquad (2)$$

In the above high frequency magnetic field generating device, when the thickness (t cm) of the metal container is larger than a value calculated in accordance with the above formula at a specified frequency (f Hz), the high frequency electric power is concentrated to the metal container, so that an amount of the electric power applied to the getter material becomes relatively small and the temperature rising rate of the getter material is delayed whereby it becomes difficult to obtain a predetermined evaporation amount of Ba by the high frequency heating in a short time.

At this time stage, when the electric power is increased or the getter material is continued to be further heated for a long time, the metal container is heated to a temperature far exceeding a recrystallization temperature of the members constituting the metal container, so that the metal container causes a deformation or the temperature thereof is further increased thereby to melt the metal container. As a result, such defects will exert a bad influence on characteristics of the electron tube.

In this regard, as schematically shown in FIG. 1, the above metal container (getter ring) 2 is formed in such a manner that a plain metal plate is subjected to a drawing work so as to form in a cylindrical shape having a bottom wall and a protrusion extending vertically at a central portion of the metal container. The metal container comprises: an outer side wall 2*a* having a thickness of t1; a bottom wall 2*b* having a thickness of t2; an inner side wall 2*c* having a thickness of t3; and a central top portion wall 2*d* having a thickness of t4.

However, a rank order of degrees of heat affections exerted on the members by the radio frequency induction heating operation is as follows. Namely, a first rank is the outer side wall 2*a*, while a second rank is the bottom wall 2*b*. Therefore, it is necessary for at least the thickness (t1) of the outer side wall 2*a* and the thickness (t2) of the bottom wall 2*b* to make thin so that the thicknesses are less than a plate thickness (t cm) calculated by the relation formula (2).

In this connection, for the purpose of making thermal heat capacities of the respective parts of the metal container (getter ring) 2 uniform and achieving an uniformity in heat affection exerted by the high frequency heating in the entire container, it is preferable that all of the thicknesses t1, t2, t3 and t4 of the respective parts of the metal container 2 should be made thin so that the respective thicknesses are less than a plate thickness (t cm) calculated by the relation formula (2).

An electrical resistivity of the getter material prepared by press-molding a mixture of the Ba—Al alloy powder such as $BaAl_4$ or the like and Ni powder is higher than an electrical resistivity inherent to the Ba—Al alloy such as $BaAl_4$ or the like and Ni. On the other hand, the electrical resistivity of the metal container is equal to that of the metal material constituting the metal container.

In the getter material or the evaporation type getter device according to the present invention, it is preferable that a press-compacted body has an electrical resistivity of 20 mΩ-cm or less. That is, when the electrical resistivity of the getter material prepared by press-compacting a mixture of the Ba—Al alloy powder such as $BaAl_4$ or the like and Ni powder is excessively large so as to exceed 20 mΩ-cm and a getter device provided with a Ba-evaporating portion having a diameter (a minor diameter for a case where an outline shape of the Ba-evaporating portion has non-round shape such as an oval shape or the like) of 10 mm to several tens mm is generally used, an efficiency of radio frequency induction heating is extremely deteriorated. Therefore, it is preferable that the press-compacted body has the electrical resistivity of 20 mΩ-cm or less.

The electrical resistivity of the getter material can be adjusted in such a manner that material powders each having a different electrical resistance and grain sizes are appropriately combined to prepare a powder mixture and a compacting pressure for press-compacting the powder mixture is controlled. In this connection, when the grain size of the material powder is set to excessively fine, the electrical resistivity of the getter material becomes large, so that it becomes impossible to perform the radio frequency induction heating operation. Accordingly, it is technically important to use the Ba—Al alloy powder and Ni powder having the aforementioned grain size and the average grain size.

The electron tube according to the present invention is characterized by comprising thus configured evaporation type getter device. According to the electron tube of the present invention, the getter material can be sufficiently evaporated and scattered in a stable condition even if the getter device is applied to a large-scaled electron tube, thus greatly contributing to improve quality and reliability of the large-scaled electron tube.

BEST MODE FOR CARRYING OUT THE INVENTION

An embodiment of a getter material according to the present invention will be described hereunder with reference to the following Examples and Comparative Examples together with drawings.

EXAMPLES 1-4 AND COMPARATIVE EXAMPLE 1

Ni material powder having an average grain size of 5 μm in which a weight ratio of Ni powder having a grain size of 20 μm or more is 5 mass % was prepared, while alloy powder having a composition of $BaAl_4$, grain size of 44 μm or less and an average grain size of 31 μm was prepared. 54 mass % of the Ni material powder and balance of the $BaAl_4$ alloy powder were blended thereby to prepare a powder mixture as a material of getter material for the respective Examples and Comparative Examples. In this regard, the average grain size and a maximum grain size of the respective powders for constituting the getter material were measured by a particle size distribution measuring operation based on a sieve-screening method and a laser-scattering diffraction method.

Next, thus prepared material powder mixture was press-compacted at various compacting pressures shown in Table 1 thereby to prepare getter materials 3 each composed of a pressed powder mixture according to Examples 1-4 and Comparative Example 1. With respect to each of these getter materials 3 according to Examples and Comparative Example, an exothermic reaction starting temperature of the getter material 3 was measured in accordance with a method using a differential thermo gravimetric analyzer (DTA) in which the temperature of the getter material 3 was risen from a room temperature at a temperature rising rate of 10° C./min.

The exothermic reaction starting temperature of the getter material 3 could be easily measured as a heating temperature corresponding to a peak of heat generation amount. The peak of the heat generation amount was formed during a continuous heating operation for heating the getter material, and the peak was detected as a portion at which the heat generation amount was abruptly increased. In this regard, the getter material of which the exothermic reaction starting temperature was outside of the range specified in this invention was determined as Comparative Example 1.

Figure 1:
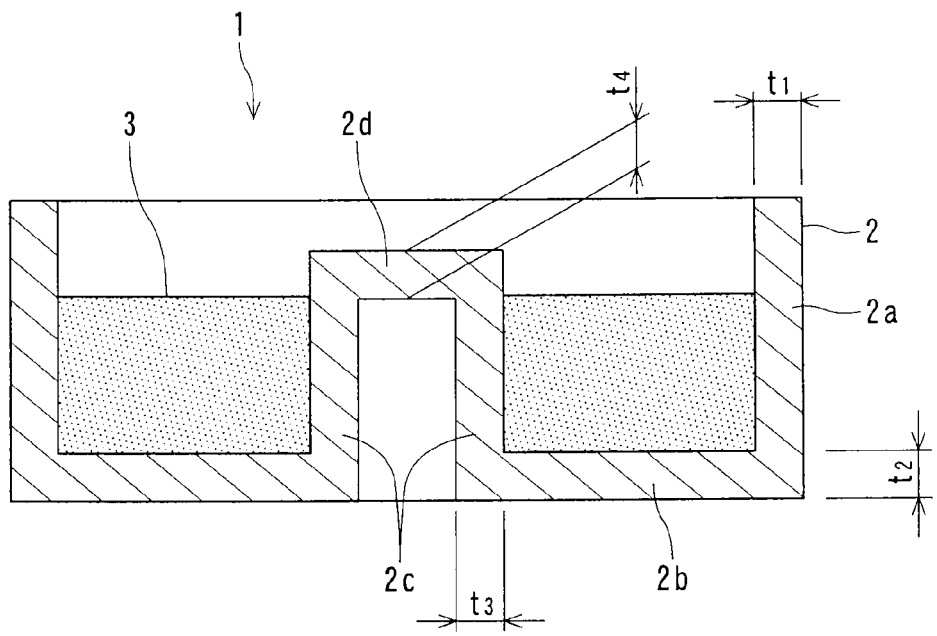
FIG. 1 is a cross sectional view schematically showing one embodiment of a getter device formed by filling a getter material according to the present invention into a metal container.

Then, as shown in FIG. 1, there were prepared metal containers 2 each composed of SUS304 provided with an outer peripheral wall 2a having a thickness t1 of 0.02 cm and a bottom wall 2b having a thickness t2 of 0.02 cm. 1.1 g of the getter material 3 was filled into each of the metal containers 2, and the filled getter materials 3 were press-compacted at a pressing force which was the same pressure as the compacting pressure used in the operation for measuring the exothermic reaction starting temperature of the getter material 3, so that the getter materials 3 were press-contacted to the metal containers 2 thereby to manufacture the respective getter devices of Examples 1-4 and Comparative Example 1.

FIG. 1 is a cross sectional view schematically showing a cross sectional structure of the getter devices 1 of the respective Examples and Comparative Example. Each of the getter devices 1 comprises: the metal container 2 composed of SUS304 stainless steel and formed by a drawing work; and the getter material 3 filled into a recessed portion of this metal container 2 by a press-contacting operation.

Each of the getter devices 1 of Examples and Comparative Example as prepared above was heated by a radio frequency induction having a frequency of 300 kHz and a constant power strength, and a time ranging from a heating-start to Ba-evaporation-start and Ba evaporation amount after heating for 30 seconds were measured. In this connection, Ba evaporation amount was measured by a weight difference of the getter material between before and after the evaporating operation. The measuring results of the Ba evaporation amount together with the compacting pressure are collectively shown in Table 1 hereunder.

TABLE 1

| Sample No. | Compacting Pressure (MPa) | Exothermic Reaction Starting Temperature (° C.) | Ba Evaporation Amount After Heating for 30 sec. (mg) | Time from Heating-Start to Ba-Evaporation-Start (sec) |
|---|---|---|---|---|
| Comparative Example 1 | 1300 | 936 | 181 | 11.6 |
| Example 1 | 1450 | 883 | 230 | 9.4 |
| Example 2 | 600 | 842 | 237 | 9.1 |
| Example 3 | 1000 | 811 | 235 | 9.0 |
| Example 4 | 1200 | 782 | 237 | 9.0 |

As is clear from the results shown in above Table 1, according to the getter devices of Examples 1-4 in which the exothermic reaction starting temperature of the getter materials composed of the respective pressed powder mixtures are specified to within a predetermined range from 782° C. to 883° C., the evaporation amount of Ba after heating for 30 seconds is large, and the values of the evaporation amounts are also stable, so that it was confirmed that the respective devices can exhibit an excellent characteristic of evaporating the getter component. In addition, the time from heating start to Ba evaporation start was short to be a level of 9 seconds or so in all Examples, so that it was also confirmed that each of the getter devices has an excellent responsiveness.

On the other hand, according to the getter device of Comparative Example 1 prepared by filling a getter material into the metal container in which the exothermic reaction starting temperature of the getter material was specified to an excessively high temperature so as to exceed 900° C., it was confirmed that Ba evaporation amount was rapidly lowered in comparison with those of Examples, and the time from heating start to Ba evaporation start was relatively prolonged so as to exceed 11 seconds, so that it was also confirmed that the responsiveness of the getter device of Comparative Example was surely inferior.

On the other hand, other than the above Comparative Example, there was also prepared a getter material in accordance with the following procedure. Namely, BaAl$_4$ alloy powder used in Examples were further finely pulverized so as to have an average grain size of 10 µm or less whereby the exothermic reaction starting temperature of the getter material was lowered to within a range of 700° C. to 740° C. With respect to the getter devices prepared by filling these getter materials into the metal containers, Ba evaporation amounts after heating for 30 seconds were measured in the same manner as in Examples. As a result, the Ba evaporation amount was sufficient and stable in any cases.

However, in the getter device using this getter material, a degradation and deterioration of the getter material was rapidly advanced in the air. Therefore, the deterioration due to oxidation was rapidly advanced in a process of assembling the getter device into the electron tube. As a result, a sufficient Ba evaporation amount could not be obtained in a practical use of the electron tube. Accordingly, it can be said that the exothermic reaction starting temperature of 750° C. or higher is more preferable range for the practical use of the getter material.

EXAMPLE 5

As Example 5, getter materials of Samples 1-3 were prepared by press-compacting three kinds of material powder mixtures each having a different grain size distribution at a compacting pressure of 800-1500 MPa.

That is, the material powder mixture for Sample 1 was prepared in accordance with the following procedures. Ni material powder having an average grain size of 6.5 µm in which a weight ratio of Ni powder having a grain size of 20 µm or more is 5 mass % was prepared, while alloy powder having a composition of BaAl$_4$, maximum grain size of 150 µm and an average grain size of 77 µm was prepared. 53 mass % of the Ni material powder and balance of the BaAl$_4$ alloy powder were blended thereby to prepare a powder mixture as a material of getter material for Sample 1.

Further, the material powder mixture for Sample 2 was prepared in accordance with the following procedures. Ni material powder having an average grain size of 13 µm in which a weight ratio of Ni powder having a grain size of 20 µm or more is 8 mass % was prepared, while alloy powder having a composition of BaAl$_4$, maximum grain size of 150 µm and an average grain size of 77 µm was prepared. 53 mass % of the Ni material powder and balance of the BaAl$_4$ alloy powder were blended thereby to prepare a powder mixture as a material of getter material for Sample 2.

Furthermore, the material powder mixture for Sample 3 was prepared in accordance with the following procedures. Ni material powder having an average grain size of 8 µm in which a weight ratio of Ni powder having a grain size of 20 µm or more is 13 mass % was prepared, while alloy powder having a composition of BaAl$_4$, maximum grain size of 150 µm and an average grain size of 77 µm was prepared. 53 mass % of the Ni material powder and balance of the BaAl$_4$ alloy powder were blended thereby to prepare a powder mixture as a material of getter material for Sample 3.

Figure 2:
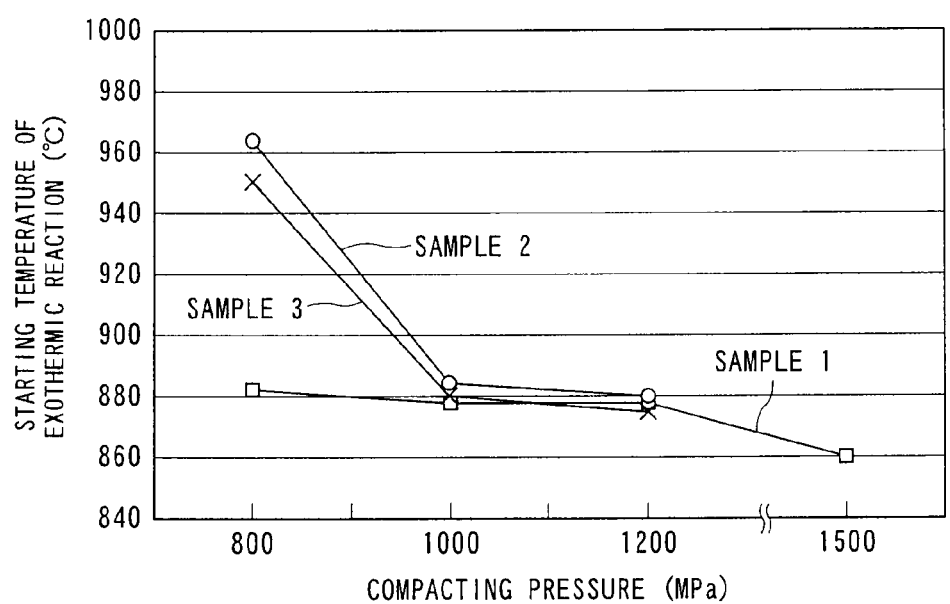
FIG. 2 is a graph showing a relationship between a compacting pressure for a getter material powder and an exothermic reaction starting temperature of the getter material powder.

Thus prepared materials for the respective getter materials were compacted at a compacting pressure of 800-1500 MPa as shown in FIG. 2 thereby to prepare the respective getter materials for Samples. Then, the exothermic reaction starting temperature of the respective getter materials were measured in the same manner as in Example 1. The measured results are shown in FIG. 2.

As is clear from the results shown in FIG. 2, according to the getter material of Sample 1, the exothermic reaction starting temperatures of the getter materials were within a range from 860° C. to 880° C. in a compacting pressure range of 800-1500 MPa, so that a suitable evaporation amount of the getter components could be expected.

On the other hand, according to the getter materials of Samples 1-2, when the materials were treated at low compacting pressure range of 800-900 MPa, the exothermic reaction starting temperatures were abruptly risen, so that it was confirmed that the suitable evaporation amount of the getter components could not be expected. Nevertheless, when the compacting pressure was set to 1000-1200 MPa in this case of Samples 1-2, a predetermined exothermic reaction starting temperature was obtained. Accordingly, when both the grain size of the material powder for the getter material and the compacting pressure are suitably controlled, a suitable exothermic reaction starting temperatures can be obtained.

EXAMPLE 6

This Example 6 shows an example in which a powder mixture composed of Ni material powder and Ba—Al alloy powder each having a further finer grain size than those of Example 5 was used as a material for the getter material. That is, Ni material powder having an average grain size of 4.5 µm in which a weight ratio of Ni powder having a grain size of 20 µm or more is 2 mass % was prepared, while $BaAl_4$ alloy material powder containing 35 mass % of $BaAl_4$ alloy powder having an average grain size of 44 µm and balance of $BaAl_4$ alloy powder having a grain size of 70-44 µm was prepared. 53 mass % of the Ni material powder and balance of the $BaAl_4$ alloy material powder were blended thereby to prepare a powder mixture as a material of getter material for Example 6.

Figure 3:
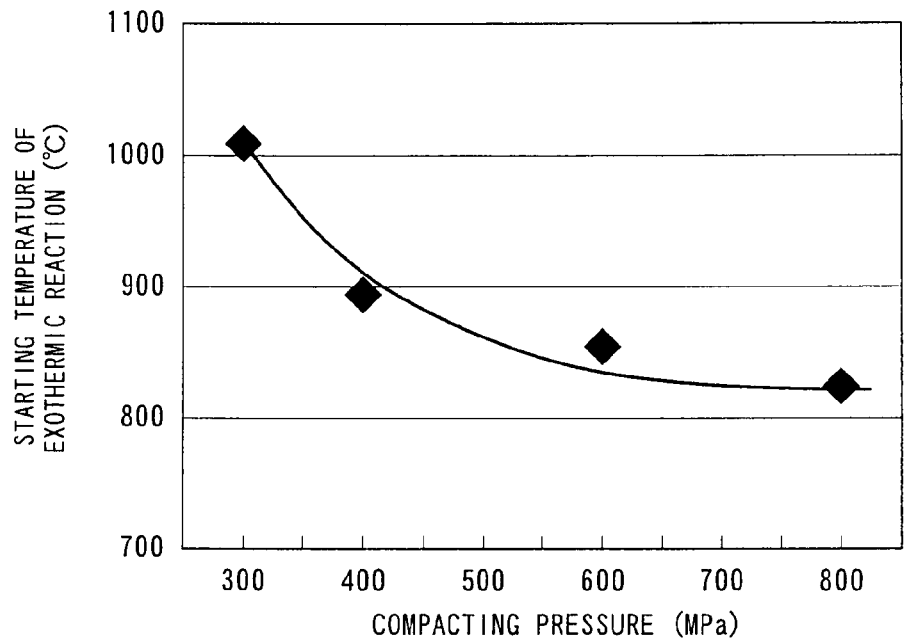
FIG. 3 is a graph showing a relationship between a compacting pressure for a getter material powder and an exothermic reaction starting temperature of the getter material powder in a case where other material powders each having a different specification are used.

Thus prepared materials for Example 6 were compacted at a compacting pressure of 300-800 MPa as shown in FIG. 3 thereby to prepare the respective getter materials for Example 6. Then, the exothermic reaction starting temperature of the respective getter materials were measured in the same manner as in Example 1. The measured results are shown in FIG. 3.

As is clear from the results shown in FIG. 3, according to the getter material of Example 6, when the materials were treated at low compacting pressure range of 400-800 MPa, the exothermic reaction starting temperatures were within a range of 800° C. to 900° C., so that it was evident that the suitable evaporation amount of the getter components could be expected.

On the other hand, when the materials were treated at low compacting pressure of less than 400 MPa, the exothermic reaction starting temperatures were abruptly risen, so that it was confirmed that the suitable evaporation amount of the getter components could not be expected.

EXAMPLES 7-9 AND COMPARATIVE EXAMPLES 2-4

Three kinds of getter material powder mixtures each having a different grain size distribution were prepared while two kinds of containers each having a different plate thickness were prepared. Then, the respective getter material powder mixtures were filled into the respective metal containers and the mixtures were press-contacted to the metal containers thereby to manufacture the respective getter devices of Examples and Comparative Examples. Thereafter, the characteristics of the respective getter devices were mutually compared.

That is, 54 mass % of Ni material powder having an average grain size of 4.5 µm in which a weight ratio of Ni powder having a grain size of 20 µm or more is 2 mass %; 35 mass % of $BaAl_4$ alloy material powder having an average grain size of 44 µm; and balance of $BaAl_4$ alloy powder having a grain size of 53-44 µm were blended thereby to prepare a powder mixture as a first material for the getter material (Example 7 and Comparative Example 2).

Further, 50 mass % of Ni material powder having an average grain size of 4 µm in which a weight ratio of Ni powder having a grain size of 20 µm or more is 3 mass %; 10 mass % of $BaAl_4$ alloy material powder having an average grain size of 44 µm; and balance of $BaAl_4$ alloy powder having a grain size of 44-53 were blended thereby to prepare a powder mixture as a second material for the getter material (Example 8 and Comparative Example 3).

Furthermore, 54 mass % of Ni powder having a grain size of 3-10 µm; 10 mass % of $BaAl_4$ alloy material powder having an average grain size of 44 µm or less; and balance of $BaAl_4$ alloy powder having a grain size of 53-44 µm; were blended thereby to prepare a powder mixture as a third material for the getter material (Example 9 and Comparative Example 4).

On the other hand, there were prepared two kinds of metal containers 2 each having a shape as shown in FIG. 1, and the metal containers 2 are formed of SUS316 stainless steel in which all of portions including the outer side wall 2a and the bottom wall 2b has a plate thickness (t) of 0.02 cm or 0.025 cm.

Then, 1.1 gram of the first to third materials was filled into the metal containers 2 formed of SUS316 and having a thin plate thickness (t) of 0.02 cm. Subsequently, the filled materials were press-compacted at a compacting pressure of 1000 MPa, thereby to prepare the getter devices of Examples 7-9.

On the other hand, 1.1 gram of the first to third materials was filled into the metal containers 2 formed of SUS316 and having a thick plate thickness (t) of 0.025 cm. Subsequently, the filled materials were press-compacted at a compacting pressure of 1000 MPa, thereby to prepare the getter devices of Comparative Examples 2-4.

Each of the getter devices of Examples and Comparative Example as prepared above was heated by a radio frequency induction having a frequency of 330 kHz and a constant power strength, and a required time ranging from a heating-start time to Ba-evaporation-start time and Ba evaporation amount after heating for 30 seconds were measured. The measuring results of the required time and Ba evaporation amount shown in FIG. 4 were obtained.

In this connection, when a plate thickness (t) of the metal container by applying the frequency of 330 kHz of the radio frequency induction for heating the getter device to the relation formula (2): $t/≦12.7/(f)^{1/2}$, a plate thickness of t ($≦0.0221$) cm is obtained. Accordingly, a specification of the getter devices of Examples 7-8 each comprising a thin metal container 2 having a plate thickness (t) of 0.02 cm satisfies the relation formula (2).

On the other hand, a specification of the getter devices of Comparative Examples 2-4 each comprising a thick metal container 2 having a plate thickness (t) of 0.025 cm would not satisfy the relation formula (2).

Figure 4:
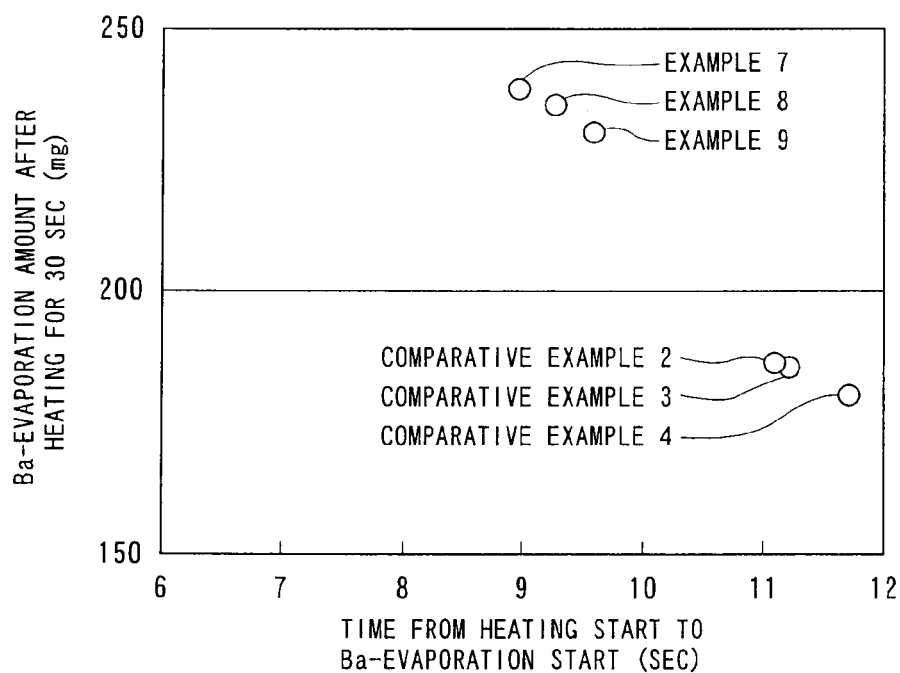
FIG. 4 is a graph showing a relationship between a time ranging from a heating start to Ba-evaporation start and amount of the evaporation of Ba component when the getter material is heated for 30 seconds.

As is clear from the results shown in FIG. 4, according to the getter devices of Examples 7-8 using a thin metal container 2, the radio frequency induction is effectively applied to the getter material filled in the metal container, and a sufficient temperature rising rate can be obtained, so that the evaporation amount of Ba after heating for 30 seconds is sufficient. In addition, a required time ranging from the heating start time to Ba evaporation start time is less than 10 seconds, thus realizing an excellent responsiveness.

On the other hand, according to the getter devices of Comparative Examples 2-4 each using the thick metal container, the generated heat was not a little absorbed to the metal container and the temperature rise of the getter material is delayed, so that the Ba evaporation amount is not sufficient. In addition, the required time from the heating start time to the Ba evaporation start time exceeds 11 seconds, so that it is again confirmed that the getter devices of Comparative Examples are inferior in responsiveness.

EXAMPLES 10-11 AND COMPARATIVE EXAMPLES 5-6

These examples show results of operating the respective getter devices in which the frequency at the time of the radio frequency induction heating is changed from those of the respective getter devices of Examples 7-10.

That is, 54 mass % of Ni material powder having an average grain size of 4.5 μm in which a weight ratio of Ni powder having a grain size of 20 μm or more is less than 2 mass %; 35 mass % of BaAl$_7$ alloy material powder having an average grain size of 44 μm; and balance of BaAl$_4$ alloy powder having a grain size of 44-53 μm were blended thereby to prepare a powder mixture as a material for the getter material. The respective getter devices were prepared by using 1.1 g of the material in accordance with the following procedures.

Namely, 1.1 g of the material was filled into a metal container composed of a low-carbon steel plate having a thickness of 0.015 cm, and the filled material was compacted at a compacting pressure of 800 MPa thereby to prepare a getter device of Example 10.

While, 1.1 g of the material was filled into a metal container composed of a low-carbon steel plate having a thickness of 0.022 cm, and the filled material was compacted at a compacting pressure of 800 MPa thereby to prepare a getter device of Comparative Example 5.

The getter devices of Example 10 and Comparative Example 5 were heated by radio frequency induction power having a frequency of 500 kHz. When the radio frequency induction power for heating the getter device of Example 10 was set to a level so that the time from the heating start time to Ba evaporation start time was 9.5 seconds, a Ba evaporation amount of 228 mg was obtained after the heating operation for 30 seconds.

On the other hand, when the getter device of Comparative Example 5 was heated by the same high frequency electric power as in Example 10, the time from the heating start time to Ba evaporation start time was 11.6 seconds, a Ba evaporation amount of 182 mg was obtained after the heating operation for 30 seconds. When the frequency (f) at this time was applied to the relation formula: $t \leq 12.7/(f)^{1/2}$, a thickness limitation of $t \leq 0.018$ (cm) was obtained.

Next, 1.1 g of the same material for the getter material as in Example 10 was used for preparing the getter devices of Example 11 and Comparative Example 6 in accordance with the following procedures.

Namely, 1.1 g of the material was filled into a metal container composed of SUS410 a ferrite type stainless steel plate having a thickness of 0.02 cm, and the filled material was compacted at a compacting pressure of 1000 MPa thereby to prepare a getter device of Example 11.

While, 1.1 g of the material was filled into a metal container composed of a ferrite type stainless steel plate having a thickness of 0.03 cm, and the filled material was compacted at a compacting pressure of 1000 MPa thereby to prepare a getter device of Comparative Example 6.

The getter devices of Example 11 and Comparative Example 6 were heated by radio frequency induction power having a frequency of 250 kHz. When the radio frequency induction power for heating the getter device of Example 11 was set to a level so that the time from the heating start time to Ba evaporation start time was 9.6 seconds, a Ba evaporation amount of 230 mg was obtained after the heating operation for 30 seconds.

On the other hand, in case of Comparative Example 6, when the getter device was heated by the same high frequency heating electrical power as in Example, the time from heating start to Ba evaporation start was 11.7 seconds, while the Ba evaporation amount after heating for 30 seconds was 177 mg. In case of the frequency (f) of 250 kHz, when a plate thickness (t) is calculated on the basis of the relation formula: $t \leq 12.7/(f)^{1/2}$, the thickness relation: $t \leq 0.0254$ (cm) is obtained.

INDUSTRIAL APPLICABILITY

According to the present invention, since the temperature at which the pressed powder mixture starts the exothermic reaction is set within a range from 750° C. to 900° C., there can be provided a getter material and an evaporation type getter device capable of suitably controlling an evaporation amount of getter components under a stable condition, and is excellent in responsiveness because a time ranging from a starting time of heating the getter material to a starting time of evaporation of the getter components can be shortened. In addition, the metal container to be filled with the getter material is free from deformation and melting, and a heat-evaporation process time of the getter material can be shortened, so that there can be provided the evaporation type getter device excellent in responsiveness because a time required for the electron tube to attain to a predetermined vacuum degree can be also shortened.

The invention claimed is:

1. A process of evaporating a Ba-containing getter, comprising:
   inductively heating a pressed powder mixture comprising a Ba—Al alloy powder and a Ni powder present in a metal container having a plate thickness of t cm with an alternating current magnetic field at a frequency of f Hz,
   exothermically reacting the inductively heated Ba—Al alloy powder and the Ni powder in the pressed powder mixture at a temperature of from 750° C. to 900° C., and
   evaporating a Ba component from the exothermically reacted pressed powder mixture;
   wherein the metal container containing the pressed powder mixture is formed of at least one material selected from the group consisting of Fe, Ni, a Fe alloy and a Ni alloy,
   wherein during the inductive heating the plate thickness t of the metal container and the frequency f of the alternating current magnetic field satisfy:

$t \leq 12.7/(f)^{1/2}$; and wherein the pressed powder mixture is inductively heated in a vacuum atmosphere or an inert gas atmosphere.

2. The process according to claim 1, wherein the Ni powder has an average grain size of 10 μm or less.

3. The process of claim 2, wherein in the Ni powder the ratio of Ni powder having an average grain size of 20 μm or more with respect to the entire Ni powder is 10 mass % or less.

4. The process according to claim 2, wherein the Al is present in a mass ratio of 27-50% relative to the mass of Ba in the Ba—Al alloy powder.

5. The process according to claim 2, wherein the exothermic reacting and the evaporating are carried out at the same time.

6. The process according to claim 1, further comprising:
   press-compacting a powder mixture comprising the Ba—Al alloy powder and the Ni powder at a compacting pressure of 400 MPa or more to form the pressed powder mixture.

7. The process according to claim 6, wherein the pressed powder mixture has an electrical resistivity of 20 mΩ-cm or less.

8. The process according to claim 1, wherein the evaporating is carried out in an electron tube.

9. The process according to claim 1, wherein the weight ratio of the Ba—Al alloy powder having a grain size of 1 μm or less is 10% by weight or less based on the total weight of the Ba—Al alloy powder.

10. The process according to claim 1, wherein the mass ratio of the Ba—Al alloy powder and the Ni powder is 48:52 to 56:44.

11. The process according to claim 1, wherein the metal container and the pressed powder mixture are sealed inside an electron tube and the metal container is inductively heated by high frequency electric power applied from outside the electron tube.

12. The process according to claim 1, wherein:
the Ni powder has an average grain size of 5 μm;
the weight ratio of the Ni powder having a grain size of 20 μm or more is 5 mass % or less based on the total mass of the Ni powder;
the Ba—Al alloy powder has a grain size of 44 μm or less;
the Ba—Al alloy powder and the Ni powder are press compacted at a pressure of 600-1,450 MPa;
the Ba—Al alloy powder and the Ni powder are exothermically reacted at a temperature of 782-883° C.;
a time from beginning the exothermic reacting to the evaporating is from 9 to 9.4 seconds; and
the Ba component is evaporated in an amount of 230-237 mg during 30 seconds.

13. The process according to claim 1, wherein the exothermic reacting is carried out at a temperature of from 860 to 880° C. and a mixed powder of Ba—Al alloy powder and the Ni powder is press compacted at a pressure of 800-1,500 MPa to form the pressed powder mixture.

14. The process according to claim 1, wherein the Ba component is evaporated in an amount of 200-250 mg after heating for 30 seconds.

15. The process according to claim 1, wherein $t \leqq 0.0254$ cm.

* * * * *